United States Patent
Tipping et al.

(10) Patent No.: US 8,456,475 B2
(45) Date of Patent: Jun. 4, 2013

(54) MOTION LINE SWITCHING IN A VIRTUAL ENVIRONMENT

(75) Inventors: Michael E. Tipping, Girton (GB); Mark A. Hatton, Eye (GB)

(73) Assignee: Microsoft Corporation, Redmond, WA (US)

( * ) Notice: Subject to any disclaimer, the term of this patent is extended or adjusted under 35 U.S.C. 154(b) by 1759 days.

(21) Appl. No.: 11/319,243

(22) Filed: Dec. 28, 2005

(65) Prior Publication Data

US 2009/0051690 A1   Feb. 26, 2009

Related U.S. Application Data

(63) Continuation-in-part of application No. 10/609,997, filed on Jun. 30, 2003, now Pat. No. 7,358,973.

(51) Int. Cl.
*G06T 13/00* (2006.01)

(52) U.S. Cl.
USPC ............... 345/474; 345/418; 345/473

(58) Field of Classification Search
None
See application file for complete search history.

(56) References Cited

U.S. PATENT DOCUMENTS

| | | | |
|---|---|---|---|
| 4,805,121 A | 2/1989 | Scott et al. | |
| 4,952,152 A | 8/1990 | Briggs et al. | |
| 5,269,687 A | 12/1993 | Mott et al. | |
| 5,287,446 A | 2/1994 | Williams et al. | |
| 5,425,139 A | 6/1995 | Williams et al. | |
| 5,435,553 A | 7/1995 | Arima et al. | |
| 5,502,638 A * | 3/1996 | Takenaka | 701/87 |
| 5,613,055 A | 3/1997 | Shimoura et al. | |
| 5,696,674 A | 12/1997 | Trovato et al. | |
| 5,717,848 A | 2/1998 | Watanabe et al. | |
| 5,751,573 A | 5/1998 | Cameron et al. | |
| 5,764,241 A | 6/1998 | Elliott et al. | |
| 5,772,504 A | 6/1998 | Machiguchi | |
| 5,800,263 A | 9/1998 | Hayashida | |
| 5,808,887 A | 9/1998 | Dorst et al. | |
| 5,823,872 A | 10/1998 | Prather et al. | |
| 5,847,776 A | 12/1998 | Khmelnitsky et al. | |
| 5,872,575 A | 2/1999 | Segal | |
| 5,910,046 A | 6/1999 | Wada et al. | |

(Continued)

FOREIGN PATENT DOCUMENTS

JP    08-196744    8/1996
JP    09-070483    3/1997

(Continued)

OTHER PUBLICATIONS

Bennewitz, Maren; et al. "Using EM to Learn Motion Behaviors of Persons with Mobile Robots"; IEEE 2002; pp. 502-507.

(Continued)

*Primary Examiner* — Said Broome

(57) ABSTRACT

A computing system enhances the human-like realism of computer opponents in racing-type games and other motion-related games. The computing system observes multiple pre-scribed motion lines and computes switching probabilities attributed to switching of simulated motion of a racer from one prescribed motion line to another. A sampling module samples at random over the switching probabilities to select one of the switching probabilities. At least one control signal is generated to switch simulated motion of the entity in a virtual reality environment from the first prescribed motion line to one of the other prescribed motion lines, in accordance with the selected one of the switching probabilities.

23 Claims, 9 Drawing Sheets

U.S. PATENT DOCUMENTS

| | | | |
|---|---|---|---|
| 5,966,132 | A | 10/1999 | Kakizawa et al. |
| 6,004,016 | A | 12/1999 | Spector |
| 6,007,423 | A * | 12/1999 | Nakamura ............... 463/6 |
| 6,031,549 | A | 2/2000 | Hayes-Roth |
| 6,084,590 | A | 7/2000 | Robotham et al. |
| 6,091,427 | A | 7/2000 | Boezeman et al. |
| 6,108,010 | A | 8/2000 | Boezeman et al. |
| 6,111,590 | A | 8/2000 | Boezeman et al. |
| 6,115,052 | A | 9/2000 | Freeman et al. |
| 6,117,007 | A | 9/2000 | Matsuyama et al. |
| 6,117,008 | A | 9/2000 | Machiguchi |
| 6,157,677 | A | 12/2000 | Martens et al. |
| 6,160,907 | A | 12/2000 | Robotham et al. |
| 6,195,626 | B1 | 2/2001 | Stone |
| 6,199,030 | B1 | 3/2001 | Stone |
| 6,213,871 | B1 | 4/2001 | Yokoi |
| 6,217,445 | B1 | 4/2001 | Inoue |
| 6,290,357 | B1 | 9/2001 | Massengill et al. |
| 6,319,121 | B1 | 11/2001 | Yamada et al. |
| 6,371,856 | B1 | 4/2002 | Niwa |
| 6,373,492 | B1 | 4/2002 | Kroitor |
| 6,406,369 | B1 | 6/2002 | Baerlocher et al. |
| 6,422,869 | B1 | 7/2002 | Nagarajan et al. |
| 6,462,742 | B1 | 10/2002 | Rose et al. |
| 6,487,304 | B1 | 11/2002 | Szeliski |
| 6,494,784 | B1 | 12/2002 | Matsuyama |
| 6,577,315 | B1 | 6/2003 | Kroitor |
| 6,608,624 | B1 | 8/2003 | Wang |
| 6,733,383 | B2 | 5/2004 | Busse et al. |
| 6,757,824 | B1 | 6/2004 | England |
| 6,763,325 | B1 | 7/2004 | Stone |
| 6,763,341 | B2 | 7/2004 | Okude |
| 6,798,443 | B1 | 9/2004 | Maguire, Jr. |
| 6,834,856 | B2 | 12/2004 | Wilson |
| 6,859,207 | B2 | 2/2005 | Nougaret et al. |
| 6,870,537 | B2 | 3/2005 | Kikuchi et al. |
| 6,958,752 | B2 | 10/2005 | Jennings, Jr. et al. |
| 6,999,094 | B1 | 2/2006 | Ito |
| 6,999,096 | B2 | 2/2006 | Sato |
| 7,090,576 | B2 | 8/2006 | Herbrich et al. |
| 7,090,577 | B2 | 8/2006 | Serizawa et al. |
| 7,167,180 | B1 | 1/2007 | Shibolet |
| 7,246,103 | B2 | 7/2007 | Herbrich et al. |
| 7,260,560 | B2 | 8/2007 | Herbrich et al. |
| 7,351,138 | B2 | 4/2008 | Busse et al. |
| 7,358,973 | B2 | 4/2008 | Herbrich et al. |
| 7,525,546 | B2 | 4/2009 | Herbrich et al. |
| 2001/0043219 | A1 | 11/2001 | Robotham et al. |
| 2002/0093503 | A1 | 7/2002 | Nougaret et al. |
| 2002/0175918 | A1 | 11/2002 | Barber |
| 2003/0109296 | A1 | 6/2003 | Leach et al. |
| 2003/0216161 | A1 | 11/2003 | Busse et al. |
| 2004/0024721 | A1 | 2/2004 | Donovan et al. |
| 2005/0148388 | A1 | 7/2005 | Vayra et al. |
| 2009/0225087 | A1 | 9/2009 | Herbrich et al. |

FOREIGN PATENT DOCUMENTS

| | | |
|---|---|---|
| JP | 09-131465 | 5/1997 |
| JP | 10-029464 | 2/1998 |
| JP | 2000-157734 | 6/2000 |
| JP | 2000-235655 | 8/2000 |
| JP | 2001-190845 | 7/2001 |
| JP | 2002-028370 | 1/2002 |
| JP | 2002-095865 | 4/2002 |
| WO | 0227616 | 4/2002 |

OTHER PUBLICATIONS

Bennewitz, M., et al.; "Expioiting Constraints During Prioritized Path Planning for Teams of Mobile Robots"; Proceedings of the 2001 IEEE/RSJ; Oct. 29-Nov. 3, 2001; pp. 393-398.

Brogan, D.C.; et al. "Dynamically simulated characters in virtual environments"; IEEE Computer Graphics and Applications; vol. 18, Issue 5; Sep.-Oct. 1998; pp. 58-69.

Brown, C.; "Kinematic and 3D Motion Prediction for Graze Control"; IEEE Interpretation of 3D Scenes; Nov. 1989; Proceedings, pp. 145-151.

Cass, S.; "Mind games [computer game AI]", IEEE Spectrum; vol. 39, Issue 12; Dec. 2002; pp. 40-44.

Han, M., et al.; "Features design in soccer video indexing"; Proceedings of the 2003 Joint Conference of the Fourth International Conference on Infomiation Communications and Signals Proceedings, 2003 and the Fourth Pacific Rim Conference on Multimedia; vol. 2; Dec. 15-18, 2003; pp. 950-954.

Howe, A.E.; "Constructing transition models of AI planner behavior"; Proceedings of the 11th Knowledge-Based Software Engineering Conference; Sep. 25-28, 1996; pp. 33-41.

Hsinchun Chen, et al.; "Expert prediction, symbolic learning, and neural networks. An experiment on greyhound racing": IEEE Expert [see also IEEE Intelligent Systems and their Applications]; vol. 9, Issue 6; Dec. 1994; pp. 21-27.

Hwang, Y.K,, et al.; "Gross motion planning-a survey": ACM Computer Survey; vol. 24, Issue 3; Sep. 1992; pp. 219-291.

Lee, et al.; "Interactive control of avatars animated with human motion data"; Proc. 29th Conf. Computer Graphics and Interactive Techniques (Jul. 23-26, 2002); SIGGRAPH '02; ACM Press; pp. 491-500.

Stevenson, R., et al.; "Real time aircraft simulation using J-MASS"; Proceedings of the IEEE 1995 National Aerospace and Electronics Conference; NAECON 1995; vol. 2; May 22-26, 1995; pp. 766-771.

Tipping, M.E.; "Deriving cluster analytic distance functions from Gaussian mixture models"; Ninth International Conference on (Conf. Publ. No. 470) Artificial Neural Networks; 1999; ICANN 99; vol. 2, Sep. 7-10, 1999; pp. 815-820.

Tipping, M.E.; "Sparse bayesian learning and the relevance vector machiine"; J. Mach Learn. Res. 1; Sep. 2001; pp. 211-244.

Trias. T.S. et al.; "Decision networks for integrating the behaviors of virtual agents and avatars"; Proceedings of the IEEE 1996 Virtual Reality Annual International Symposium; Mar. 30-Apr. 3, 1996, pp. 156-162.

Voth, D.; "When Virtual robots race, science wins"; IEEE Intelligent Systems [see also IEEE Intelligent Systems and their Applications]; vol. 19, Issue 2; Mar.-Apr. 2004; pp. 4-7.

Yang, Xianglong, et al.; "Solving sequential decision-making problems under virtual reality simulation system"; Proceedings of the Winter Simulation Conference; Dec. 9-12, 2001; pp. 905-912; vol. 2 Digital Object Identifier 10.1109/WSC:2001.977392.

Ahn, M.S., et al.; "Analysis on steady stale behavior of DEVS models"; AI, Simulation, and Planning in High Autonomy Systems; Fourth Annual Conference Proceedings "Integrating Virtual Reality and Model-Based Environments"; Sep. 20-22, 1993: pp. 142-147; Digital Object Identifier 10.1109/AIHAS.1993.410589.

Starnatakos, G.S., et al.; "Modeling tumor growth and irradiation response in vitro—a combination of high-performance computing and Web-based technologies including VRML visualization"; IEEE Transactions on Information Technology in Biomedicine, Dec. 2001; vol. 5, Issue 4.

Schmidt, G., et al.; "Toward Disambiguating Multiple Selections for Frustum-Based Pointing"; IEEE Symposium on 3D User Interfaces; Mar. 25-29, 2006; pp. 87-94: Digital Object Identifier 10.1109/VR. 2006.133.

TW Patent Appln. 93114655; Office Action of May 27, 2010; 3 pages.

EP Patent Appln. 04752529.0; Search and Exam Reports of Sep. 14, 2006; 6 pages.

KR Patent Appln. 10-2005-7022884; Office Action of Nov. 8, 2010; 5 pages.

JP Patent Appln. 2006-518617: Office Actions of Oct. 20, 2009 (5 pages); Jun. 11, 2010 (4 pages); and Jan. 14, 2011 (3 pages).

CN Patent Appln. 200480018635.9; Office Actions of Dec. 12, 2008 (10 pages); Jun. 12, 2009 (9 pages); and Oct. 9, 2009 (7 pages).

IN Patent Appln. 5508/DELNP/2005; Office Action of Jul. 9, 2009; 2 pages.

* cited by examiner

MOTION LINE SWITCHING IN A VIRTUAL ENVIRONMENT

CROSS-REFERENCE TO RELATED APPLICATIONS

This application is a continuation-in-part application of U.S. patent application Ser. No. 10/609,997, entitled "MIXTURE MODEL FOR MOTION LINES IN A VIRTUAL REALITY ENVIRONMENT" and filed on Jun. 30, 2003, specifically incorporated herein by reference for all that it discloses and teaches.

This application is related to U.S. patent application Ser. No. 10/610,167, entitled "MODIFIED MOTION CONTROL FOR A VIRTUAL REALITY ENVIRONMENT", U.S. patent application Ser. No. 10/609,507, entitled "PERSONALIZED BEHAVIOR OF COMPUTER CONTROLLED AVATARS IN A VIRTUAL REALITY ENVIRONMENT" and U.S. patent application Ser. No. 10/609,703, entitled "PROBABILISTIC MODEL FOR DISTRACTIONS IN A VIRTUAL REALITY ENVIRONMENT", all filed on Jun. 30, 2003, specifically incorporated herein by reference for all that they disclose and teach.

BACKGROUND

Most racing-based computer games provide a mode for competing against computer-controlled opponents that use a simple form of artificial intelligence (AI) to negotiate the race track or course in a simulated "human-like" fashion. However, despite the "human-like" goal of such AI, the result tends to appear quite non-human upon close observation. For example, the computer opponent may travel along an ideal or prescribed racing line on the course, whereas a human competitor inadvertently introduces continuous imperfections into his or her driving, such as over/under turning, over/under accelerating, over/under braking, and early/late reactions. However, it is just such imperfections that characterize a "human-like" competitor.

A typical AI motion control system effectively provides a computer opponent with a reaction time of 1/60th of a second in the USA or 1/50th of a second in Europe (i.e., for each frame repaint interval in the virtual reality environment). Therefore, computer control of the AI opponent in reaction to any "visual" (e.g., distance to a corner) and "physical" (e.g., loss of traction) stimuli from the virtual reality environment occurs 50 or 60 times a second. No human player can react so quickly, so frequently, or so ideally as to compete with such a perfect computer controlled opponent.

Therefore, one specific source of the non-human-like behavior of computer opponents is that the typical AI motion control system follows this prescribed racing line too perfectly, correcting its off-line motion at super-human speed (e.g., 60 times a second) and barely deviating from this ideal path. A virtual observer could follow a typical AI controlled vehicle around a course and find little or no deviation in the vehicle's path from the ideal path and little or no deviation in the AI controlled vehicle's path from lap to lap.

SUMMARY

Implementations described and claimed herein enhance the human-like realism of computer opponents in racing-type games and other motion-related games. In one implementation, the computer controlled vehicle follows a dynamically prescribed racing line in each segment of the track. This racing line may vary from segment to segment and lap to lap, roughly following an ideal or other statically prescribed racing line with some substantial variations. As such, the AI driver does not appear to statically follow the ideal line perfectly throughout the race. Instead, within each segment of the track, the AI driver's path may smoothly follow a probabilistically-determined racing line defined relative to at least one prescribed racing line. A racing line is a type of motion line applicable to racing type games.

In various implementations, articles of manufacture are provided as computer program products. One implementation of a computer program product provides a computer program storage medium readable by a computer system and encoding a computer program for a virtual reality environment. Another implementation of a computer program product may be provided in a computer data signal embodied in a carrier wave by a computing system and encoding the computer program for a virtual reality environment.

The computer program product encodes a computer program for executing on a computer system a computer process for a virtual reality environment. A dynamically prescribed motion line is computed based on a probabilistic distribution relative to at least one statically prescribed motion line. At least one control signal is generated to guide motion of an entity in a virtual reality environment in accordance with the dynamically prescribed motion line.

In another implementation, a method is provided, such that a dynamically prescribed motion line is computed based on a probabilistic distribution relative to at least one statically prescribed motion line. At least one control signal is generated to guide motion of an entity in a virtual reality environment in accordance with the dynamically prescribed motion line.

In yet another implementation, a system is provided, such that a mixture model line sampling module computes a dynamically prescribed motion line based on a probabilistic distribution relative to at least one statically prescribed motion line. In addition, an artificial intelligence motion control system generates at least one control signal to guide motion of an entity in a virtual reality environment in accordance with the dynamically prescribed motion line.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Racing-based computer games typically include a mode in which one or more human players can compete against one or more computer-controlled opponents. For example, a human player may drive a virtual race car against a computer-controlled virtual race car purported to be driven by Mario Andretti or some other race car driver.

In one implementation, the behavior of the computer-controlled virtual vehicle or other virtual reality entity may be made more human-like by using a mixture model to dynamically determine a prescribed racing line that the AI driver is to follow for a given segment of the track. It should also be understood that implementations may be applied to various types of racing games, including boat racing, skiing, skating, plane racing, etc., and other types of non-racing motion-based simulations, including combat simulations, reality simulations, etc.

Figure 1:
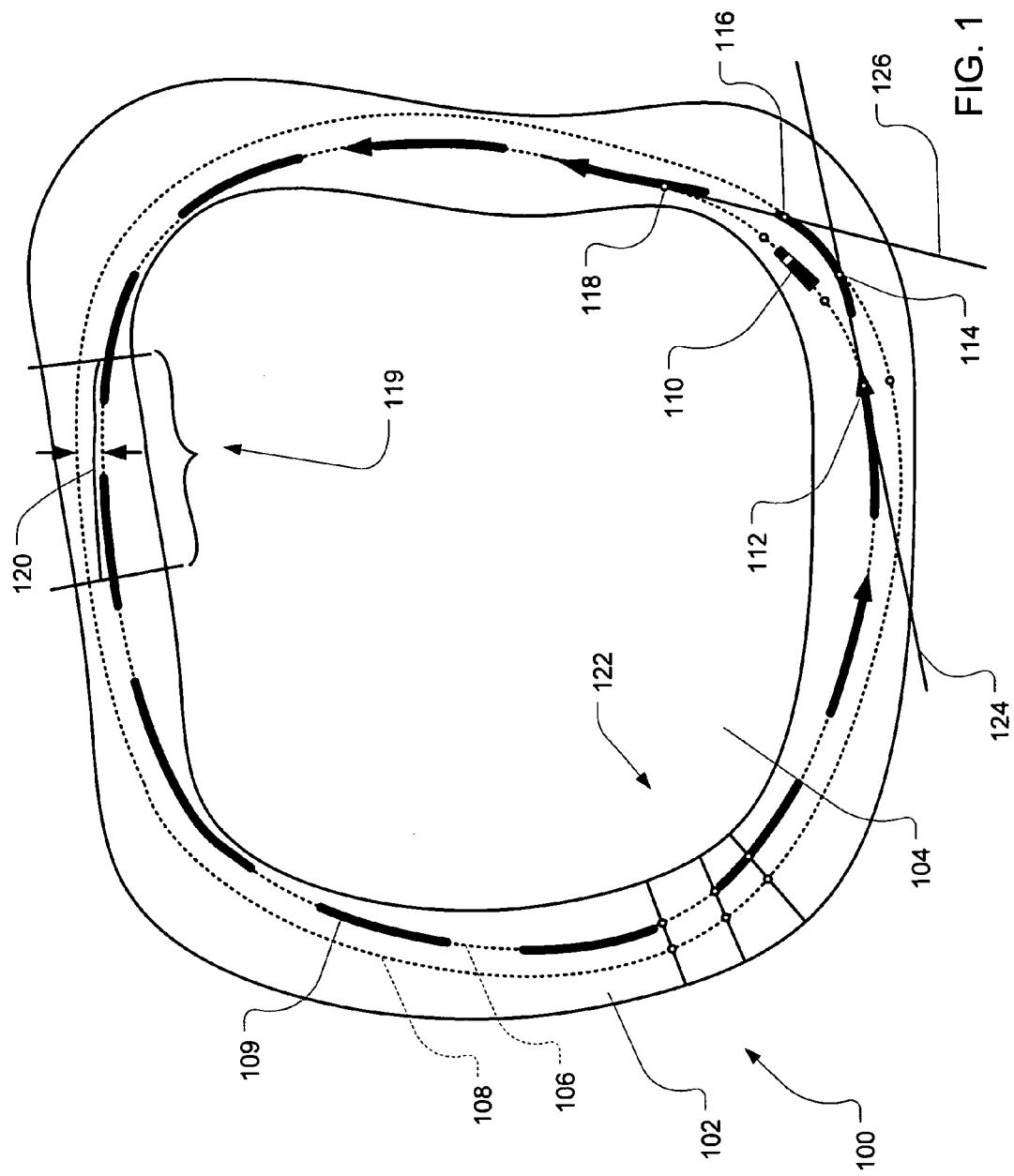
FIG. 1 illustrates a race course, exemplary prescribed racing lines, and an exemplary simulated path of a virtual race vehicle.

FIG. 1 illustrates a race course, exemplary prescribed racing lines, and an exemplary simulated path of a virtual vehicle. A virtual race course 100 includes a racing surface 102 and an infield 104. It should be understood that an alternative course may not be closed or may be applied to a non-racing environment, such as a first person shooter game, a military simulation, or a reality simulation. As such, a computer controlled driver may be replaced by a computer controlled (or AI controlled) player represented by any moving object.

A prescribed racing line 106 (going in the counterclockwise direction) is associated with the virtual race course 100. Such a prescribed racing line 106 may be statically designed into the game by the game designers as the target line for the AI controlled drivers. Various types of prescribed racing lines may include ideal and non-ideal racing lines for a course and may be characterized by various ideal and non-ideal parameters, including steering, braking, speed, and acceleration parameter sequences.

During a race, at a specified interval (such as a simulation interval or a frame interval, which may be equal in some implementations), an AI motion control system receives stimulus inputs and computes control signals based on these inputs to change the direction, speed, etc. of the computer racing vehicle. The changes are generally intended to bring the AI driver back into alignment with the prescribed racing line 106. As such, the prescribed racing line 106 provides guidance to the AI motion control system in controlling the AI driver's path along the track.

In the illustrated implementation, a secondary prescribed line 108, for example, provides a second possible racing line for an AI controlled driver (although there may be multiple secondary prescribed racing lines). Along each prescribed racing line, waypoints (such as waypoints 112, 114, 116, and 118, marked by black circles with white centers) are defined. Waypoints are used by the AI motion control system to compute proper motion control signals for the AI vehicle. It should be understood that waypoints may also be defined as intersections of lateral track waypoint lines and prescribed racing lines, as suggested by the portion of FIG. 1 shown at 122.

In some implementations, secondary prescribed racing lines are used to provide supplemental guidance for passing and obstacle avoidance. For example, a vehicle 110 is obstructing the prescribed (possibly ideal) racing line 106 of the AI driver. (The bold solid line 109 represents the actual path of the AI driver.) Therefore, when the AI motion control system determines that the AI driver should attempt to pass the vehicle 110, the AI motion control system interpolates a transitional racing line between the AI driver's current position and the next waypoint on the secondary prescribed racing line 108 (as illustrated by line 124). Such interpolation may include linear interpolation with or without additional smoothing. Likewise, when the AI motion control system determines that the AI driver has passed the vehicle 110 and should return to the ideal line 106, the AI motion control system interpolates another transitional racing line to guide the AI driver to waypoint 118 (as illustrated by line 126). Upon returning to the prescribed racing line 106, the AI motion control system attempts to continue along this line until another obstacle is encountered.

Ideal and secondary prescribed racing lines may also be used with a mixture model to provide a more realistic behavior for an AI driver. In one implementation, at least two prescribed racing lines are used to determine a dynamically prescribed racing line for individual track segments (e.g., one or more full laps or smaller track segments). As such, in FIG. 1, a different dynamically prescribed racing line may be computed between the prescribed lines 106 and 108 for every lap (although in other implementations, the dynamically prescribed racing line may be alternatively defined outside of lines 106 and 108.)

It should be understood that the term "dynamically prescribed" does not require that the prescribed racing lines be computed during game time. In some implementations, the prescribed racing lines for multiple track segments, laps or AI controlled components may be computed prior to the start of the race and merely applied during the race. In this implementation, dynamically prescribed racing lines implies that the racing lines are not statically prescribed at development time nor are they merely selected from a set of racing lines that were statically prescribed at development time. As such, dynamically prescribed racing lines are computed relative to at least one statically prescribed racing line, but are not statically prescribed themselves.

In such an implementation, for example, an exemplary dynamically prescribed racing line for a track segment 119 in a subsequent lap is shown at 120. In this manner, the AI driver need not follow the same prescribed racing line for the same track segment in multiple laps, thereby providing a richer, more realistic racing experience for a human driver competing against the AI driver.

Figure 2:
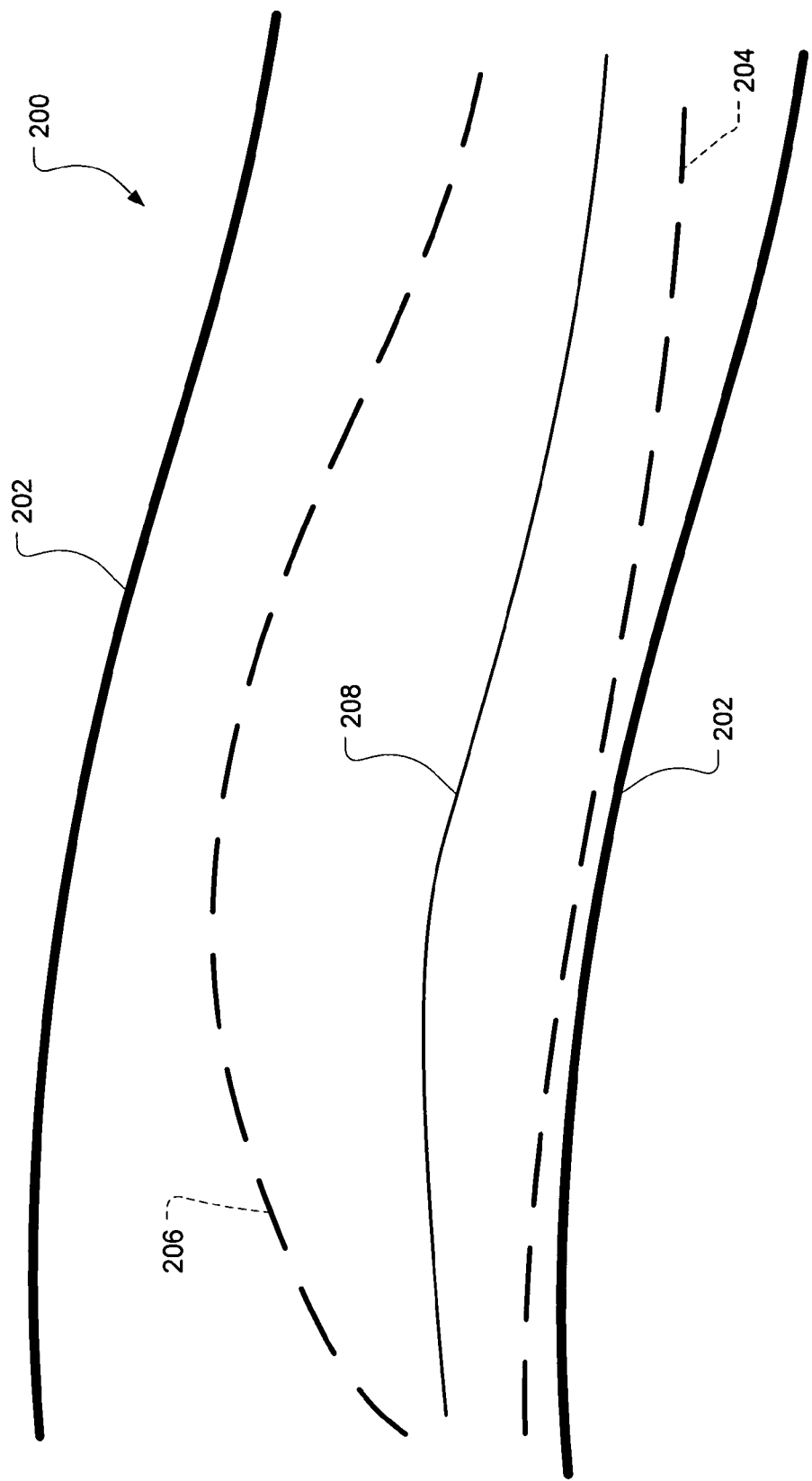
FIG. 2 illustrates a definition of an exemplary dynamically prescribed racing line for a track segment.

FIG. 2 illustrates a definition of an exemplary dynamically prescribed racing line 208 for a track segment 200. Lines 202 represent the side boundaries of the track segment 200. One prescribed racing line 204 may represent an ideal racing line, although there is no requirement that this line is ideal—it merely represents one prescribed racing line. A second prescribed racing line 206 may represent a less-than ideal racing line, although, again, this is not a requirement of the second prescribed racing line—it merely represents a second prescribed racing line.

Given the two prescribed racing lines 204 ($L^0$) and 206 ($L^1$), a mixture model line sampling module computes the dynamically prescribed racing line 208 relative to the prescribed racing lines 204 and 206. In the illustration of FIG. 2, the dynamically prescribed racing line 208 is substantially a 50-50 mixture of the prescribed racing lines 204 and 206.

In one implementation, a dynamically prescribed racing line L is defined using a distribution function y and two statically prescribed racing lines $L^0$ and $L^1$. For example, a probabilistic distribution function, such as Gaussian distribution $$y = N(\mu, \sigma) \quad (1)$$

may be used, with mean $\mu$ and standard deviation $\sigma$, although other distribution factors may be used. Given a distribution function y, a mixture parameter $\lambda$ may be computed (controlling the deviation of the dynamically prescribed racing line from one or the other of the dynamically prescribed racing lines) such that $$\lambda \epsilon [0,1] \quad (2)$$

using a variety of mixture functions. One such mixture function $f(y) = \lambda$ is defined as $$\lambda = f(y) = \frac{e^y}{1 + e^y} \quad (3)$$

and is applied to define a dynamically prescribed racing line L using Equation (4).

$$L = \lambda L^0 + (1-\lambda) L^1 \quad (4)$$

It should be understood however, that a variety of distribution functions, mixture functions and dynamically prescribed racing line functions may be employed, including non-Gaussian distribution functions, beta functions, and dynamically prescribed racing line functions that depend on only one prescribed racing line or more than two prescribed racing lines.

As mentioned previously, the mixture resulting in the dynamically prescribed racing line 208 appears to be roughly a 50-50 mixture of the prescribed racing lines 204 and 206. Other exemplary mixtures are shown in FIGS. 3 and 4.

Figure 3:
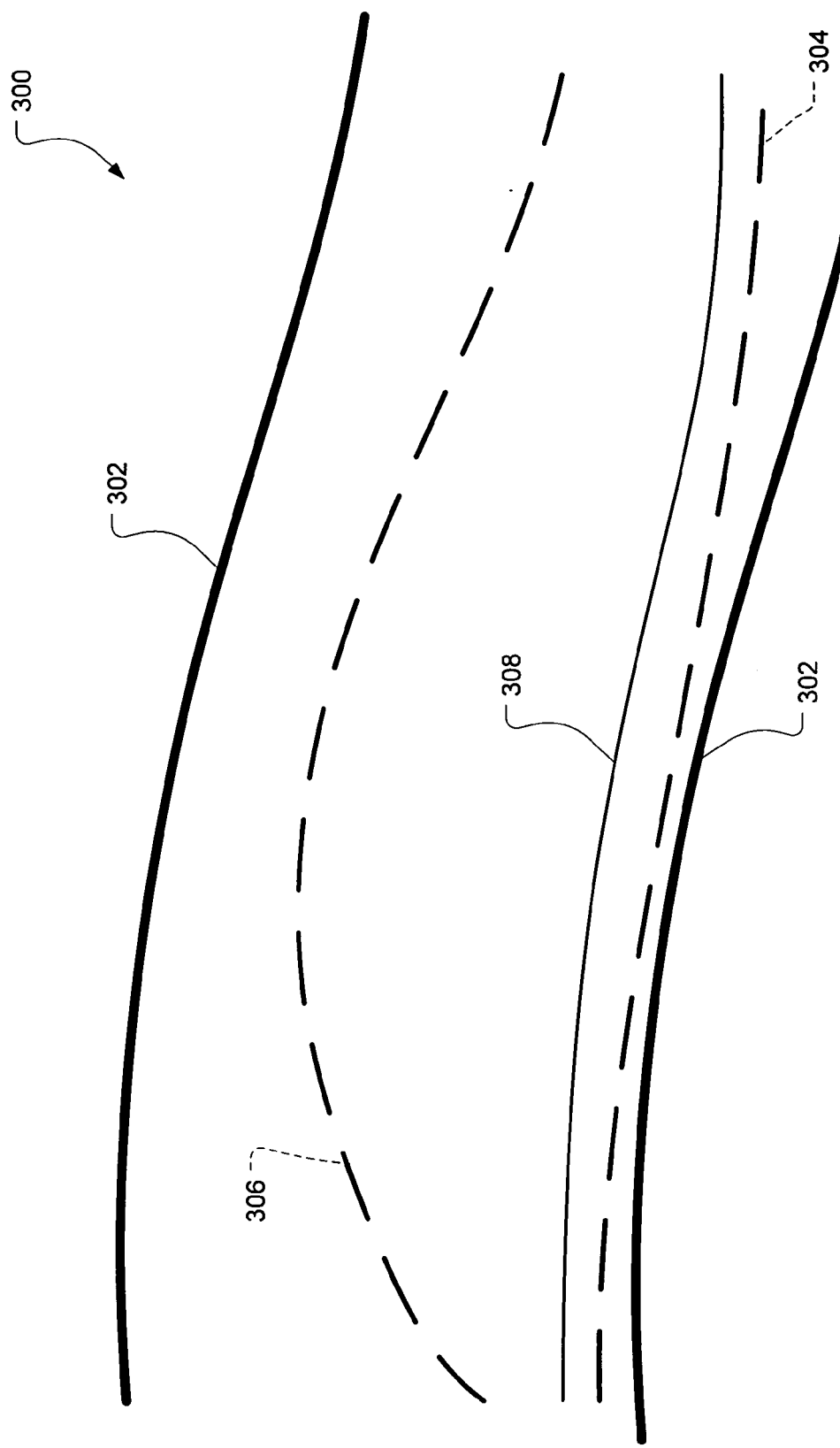
FIG. 3 illustrates a definition of another exemplary dynamically prescribed racing line for a track segment.

FIG. 3 illustrates a definition of another exemplary dynamically prescribed racing line 308 for a track segment 300. Lines 302 represent the side boundaries of the track segment 300. Given two prescribed racing lines 304 ($L^0$) and 306 ($L^1$), a mixture model line sampling module computes the dynamically prescribed racing line 308 relative to the prescribed racing lines 304 and 306. In the illustration of FIG. 3, the dynamically prescribed racing line 308 is mixture favoring the prescribed racing lines 304. For example, using Equation (4), a mixture parameter $\lambda$ equaling 0.95 may result in such a dynamically prescribed racing line L (308).

Figure 4:
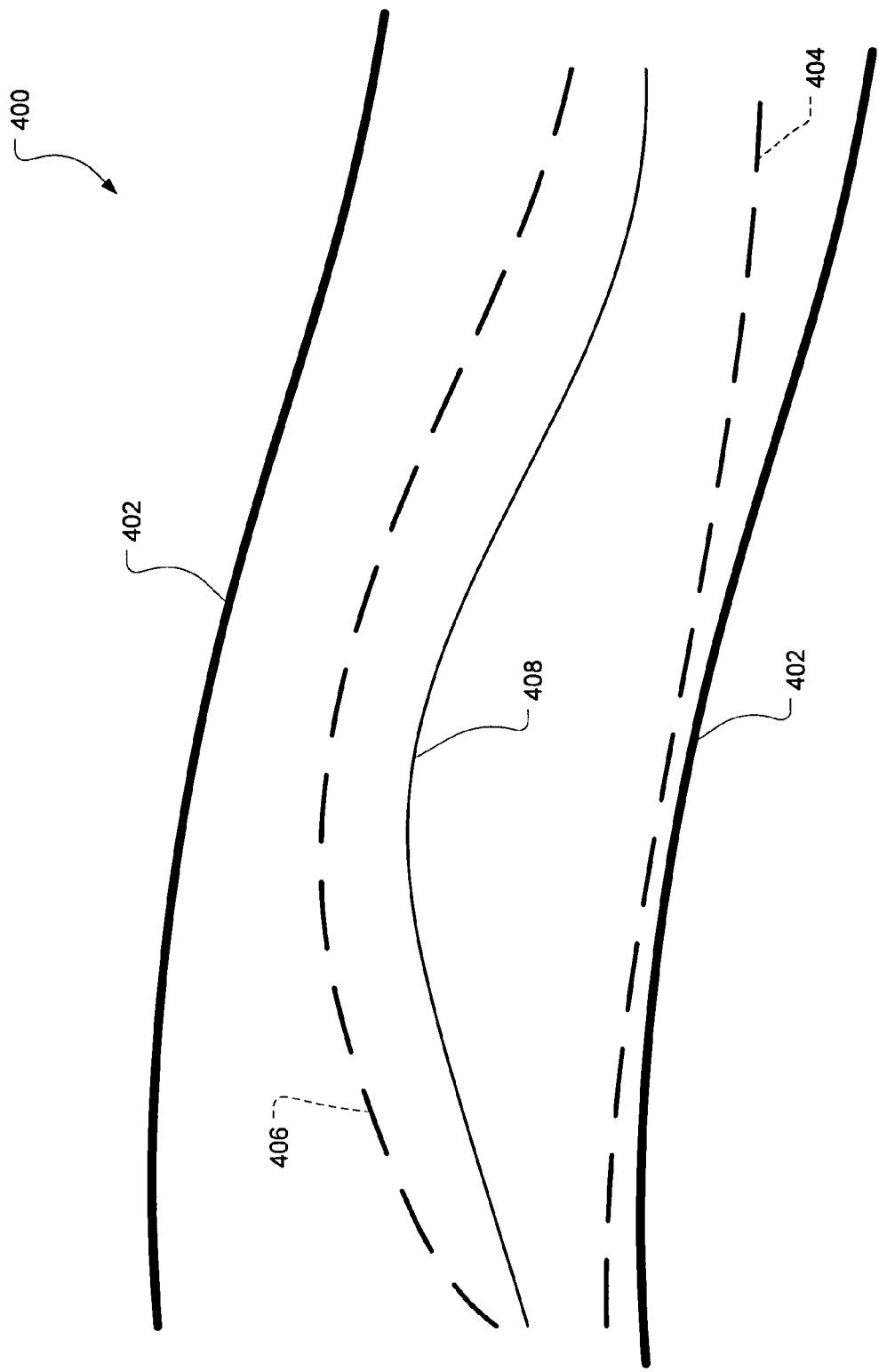
FIG. 4 illustrates a definition of yet another exemplary dynamically prescribed racing line for a track segment.

FIG. 4 illustrates a definition of yet another exemplary dynamically prescribed racing line 408 for a track segment 400. Lines 402 represent the side boundaries of the track segment 400. Given two prescribed racing lines 404 ($L^0$) and 406 ($L^1$), a mixture model line sampling module computes the dynamically prescribed racing line 408 relative to the prescribed racing lines 404 and 406. In the illustration of FIG. 4, the dynamically prescribed racing line 408 is mixture favoring the prescribed racing lines 406. For example, using Equation (4), a mixture parameter $\lambda$ equaling 0.10 may result in such a dynamically prescribed racing line L (408).

The boundaries between track segments may be referred to a "seams". In order to smooth the transition at a seam between a dynamically prescribed racing line of one segment and a dynamically prescribed racing line of the next segment, a transitional lead-in distance may be defined in terms of a number of waypoints into the next segment. The transitional racing line at the seam may be defined by a linear interpolation from a point in the first track segment (e.g., the last track location in that segment) to the waypoint that is located at the transitional lead-in distance into the next track segment. It should be understood, however, that other smoothing methods may also be employed.

Figure 5:
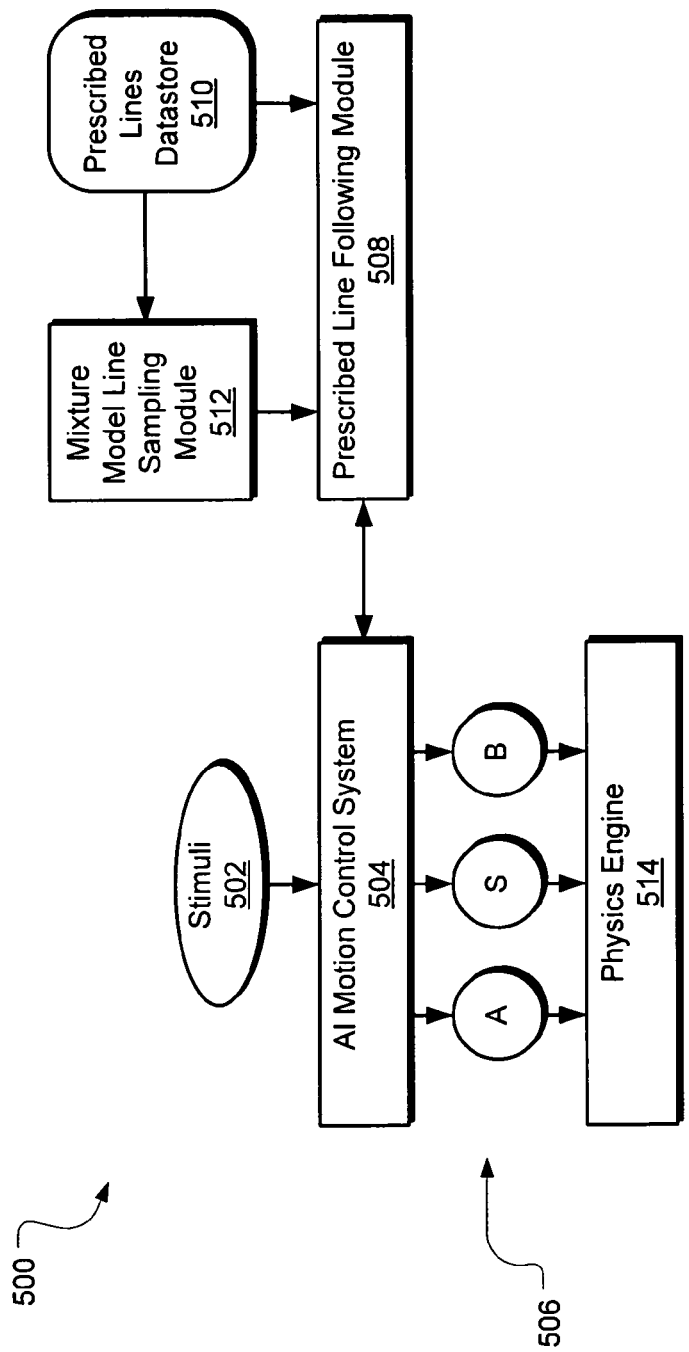
FIG. 5 illustrates exemplary components of a virtual racing game system.

FIG. 5 illustrates exemplary components of a virtual racing game system 500. In this implementation, stimuli 502 received from the virtual reality environment are input to an AI motion control system 504. Stimuli 502 may include various types of stimuli, including without limitation those stimuli listed below:

"Visual" stimuli—Includes structures, objects, actions, and characteristics which would be seen by a virtual driver controlling the race in the virtual reality environment (e.g., other racers, walls, obstacles, course markings, accident debris, etc.).

"Physical" stimuli—Includes non-visual sensations detected by a virtual driver controlling the racing vehicle in the virtual reality environment (e.g., loss of tire traction, heat, fatigue, audio signals, bumps by other vehicles, etc.).

Each type of stimuli may be represented by a stimulus signal, which in one implementation, includes a parameter value indicating the properties of the particular type of stimulus in a given simulation interval. For example, one visual stimulus signal may indicate the location of another driver on the course relative to the current driver. Furthermore, visual stimuli may be divided into directional components or sets, such as forward visual stimuli received from in front of the vehicle and rearward visual stimuli received through a rear view mirror or side view mirrors. These components may also be further decomposed (e.g., separating the stimuli from different mirrors).

Directional visual stimuli may result in directional distractions. For example, seeing a vehicle approach in its rear view mirror may cause the AI driver to miss new forward visual stimuli for one or more frames. Likewise, seeing an accident in front of its vehicle may cause the AI driver to miss rearward visual stimuli for one or more frames. In addition, receipt of forward visual stimuli may be mutually exclusive with receipt of rearward visual stimuli in the same frame or set of frames because a human driver would not be able to effectively look forward and in the rear view mirror at the same time.

Examples of physical stimulus signals may indicate that the racing vehicle has lost traction and is skidding (e.g., a sideways motion), that the computer controlled vehicle has been hit by another car or the wall, or that a sound of an accident has been heard to the AI driver's right side. Note that physical stimuli may also be directional in nature.

The AI motion control system 504 computes control signals 506 responsive to the stimuli 502, where "A" represents an acceleration control signal, "S" represents a steering control signal, and "B" represents a braking control signal. It should be understood, however, that other types of control signals are contemplated, including without limitation a speed control signal. The control signals 506 are computed according to guidance provided by a dynamically prescribed racing line for the current track segment (or other prescribed racing lines, depending on the current stimuli, AI vehicle status, track location, etc.). It should also be understood that, based on the context of the AI vehicle in the track segment (e.g., relative to other vehicles), the AI vehicle may leave the dynamically prescribed racing line, such as to overtake, block, or ram another vehicle. In one implementation, the AI motion control module may respond to a request or trigger resulting from certain received stimuli. In another implementation, the prescribed line following module 508 may also receive as input stimuli 502 and, in response to certain conditions, generate a new dynamically prescribed line for the AI motion control system 504 within an individual track segment.

The dynamically prescribed racing line is received by the AI motion control system 504 from a prescribed racing line following module 508, which receives one or more prescribed racing lines from one or both of a prescribed racing line datastore 510 and a mixture model line sampling module 512. In one implementation, the prescribed racing line datastore 510 is statically populated (e.g., at development time or through updates) with sensible and possibly ideal racing lines for given track segments. Prescribed racing lines may be defined algorithmically or numerically (e.g., by an array of track locations for a given line). The mixture model line sampling module 512 implements a mixture model to dynamically compute a prescribed racing line for the current track segment, using one or more prescribed racing lines from the prescribed racing line datastore 510. The control signals 506 are input to a physics engine 514, which applies the control signals to the racing vehicle to simulate the motion of the AI controlled racing vehicle or other entity within the virtual reality environment.

Figure 6:
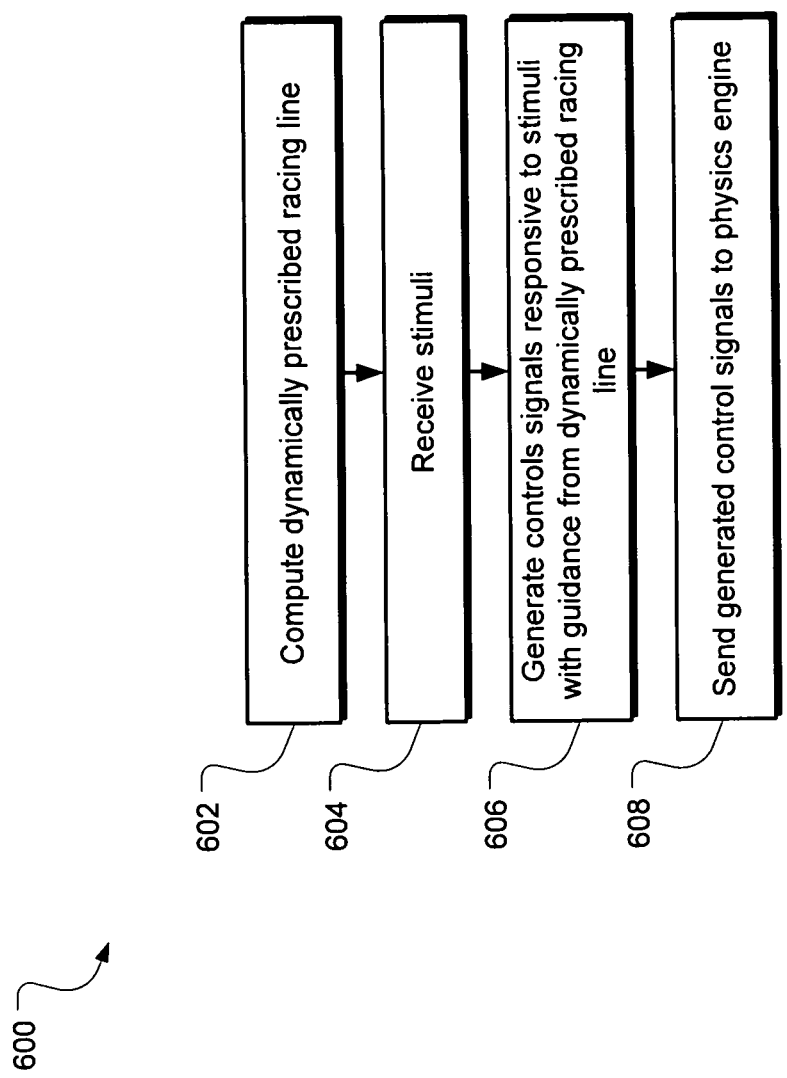
FIG. 6 illustrates operations for modifying motion simulation according to an exemplary mixture model.

FIG. 6 illustrates operations 600 for modifying motion simulation according to an exemplary mixture model. A computation operation 602 computes a dynamically prescribed racing line relative to at least one statically prescribed racing line (e.g., an ideal racing line).

It should be understood that the properties of the probabilistic distribution function may be dynamically configured before or during the race or over the period of the human player's use of the virtual reality game. For example, when the game is first played, both the human player and the AI driver may be considered novices, particularly with a given track. As such, a probabilistic distribution having a mean that favors a less ideal racing line can reflect the inexperience of the AI driver on that track. Likewise, the level of experience may also be represented by the mixture parameter. This will result in less optimal driving by the AI driver. However, as the AI driver gains "experience" on the track, the AI driver can reflect the human-like ability of learning the ideal racing line by gradually incrementing the mean of the probabilistic distribution to favor the more ideal racing line. The mixture parameter may also be adjusted to reflect a change in experience of the AI driver. Likewise, the standard deviation of the probabilistic distribution may be altered to provide smaller or larger variability in the dynamically prescribed racing line relative to the mean.

Such "experience"-based customization of the mixture model may be controlled by an experience parameter for each AI driver per each track. Therefore, as the AI driver races on a given track, the AI driver's experience parameter E for that track increases (e.g., $\mu = \alpha E$, where $\alpha$ is a proportionality constant), and the dynamically prescribed racing line approaches an ideal racing line more often.

In another implementation, experience may be temporarily decreased and the dynamically prescribed racing line for the current track sample may be recomputed in response to detection of a particular type of "distraction". In other words, if a distraction is detected, as discussed in the previously incorporated U.S. patent application Ser. No. 10/609,703, entitled "PROBABILISTIC MODEL FOR DISTRACTIONS IN A VIRTUAL REALITY ENVIRONMENT", the experience parameter E can temporarily be decreased until the driver "recovers" from the distraction.

A stimulus operation 604 receives stimuli from the virtual reality environment. A control operation 606 generates control signals based on the received stimuli with guidance for the dynamically prescribed racing line for the current track segment. A transmission operation 608 sends the generated control signals to the physics engine for application within the virtual reality environment.

Figure 7:
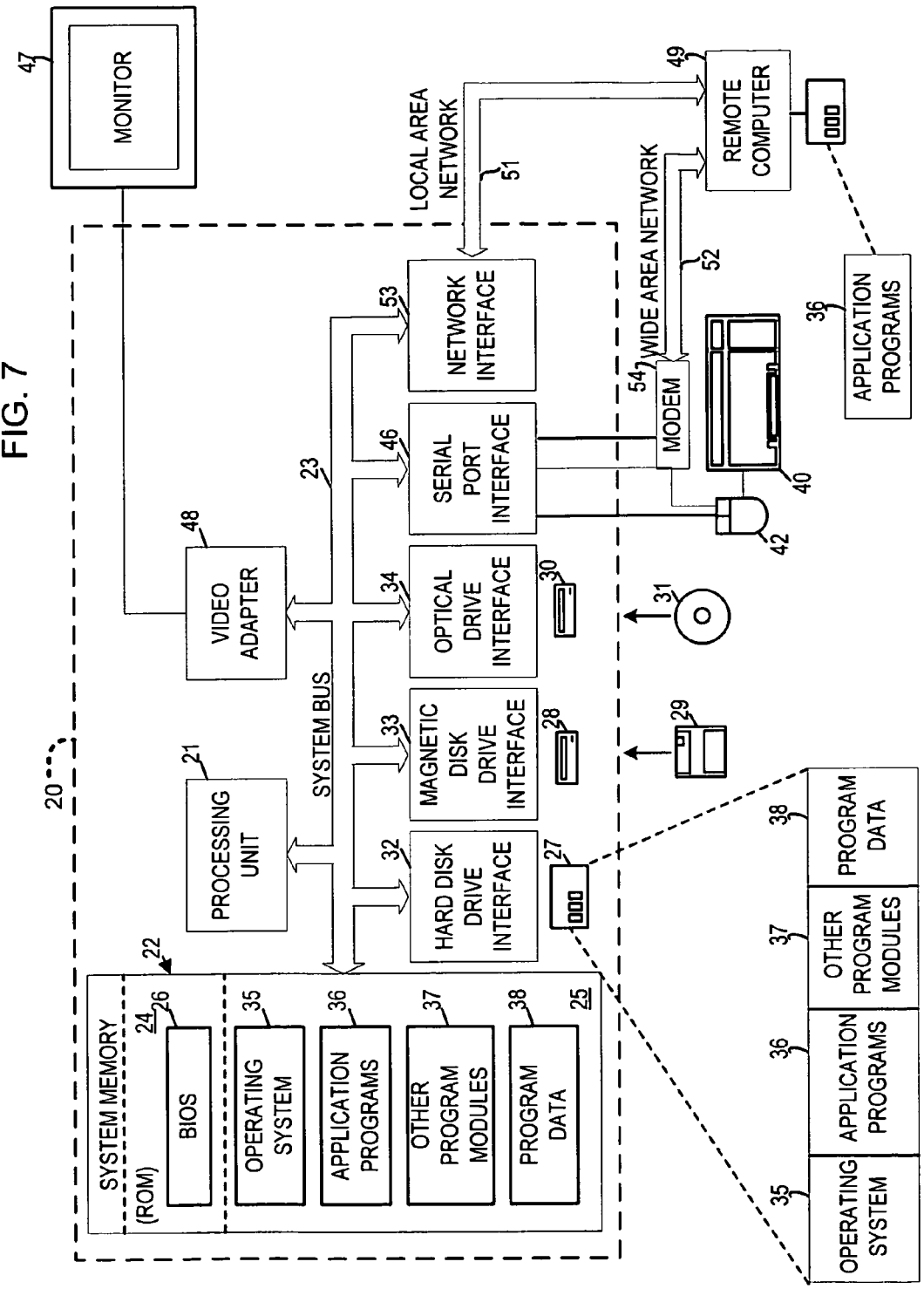
FIG. 7 illustrates an exemplary system useful for implementing an embodiment of the present invention.

The exemplary hardware and operating environment of FIG. 7 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, AI motion control systems, physics engines, mixture model line sampling modules, prescribed line following modules, or other modules may be incorporated as part of the operating system 35, application programs 36, or other program modules 37. The stimuli signals, statically prescribed racing lines, and control signals may be stored as program data 38.

Figure 8:
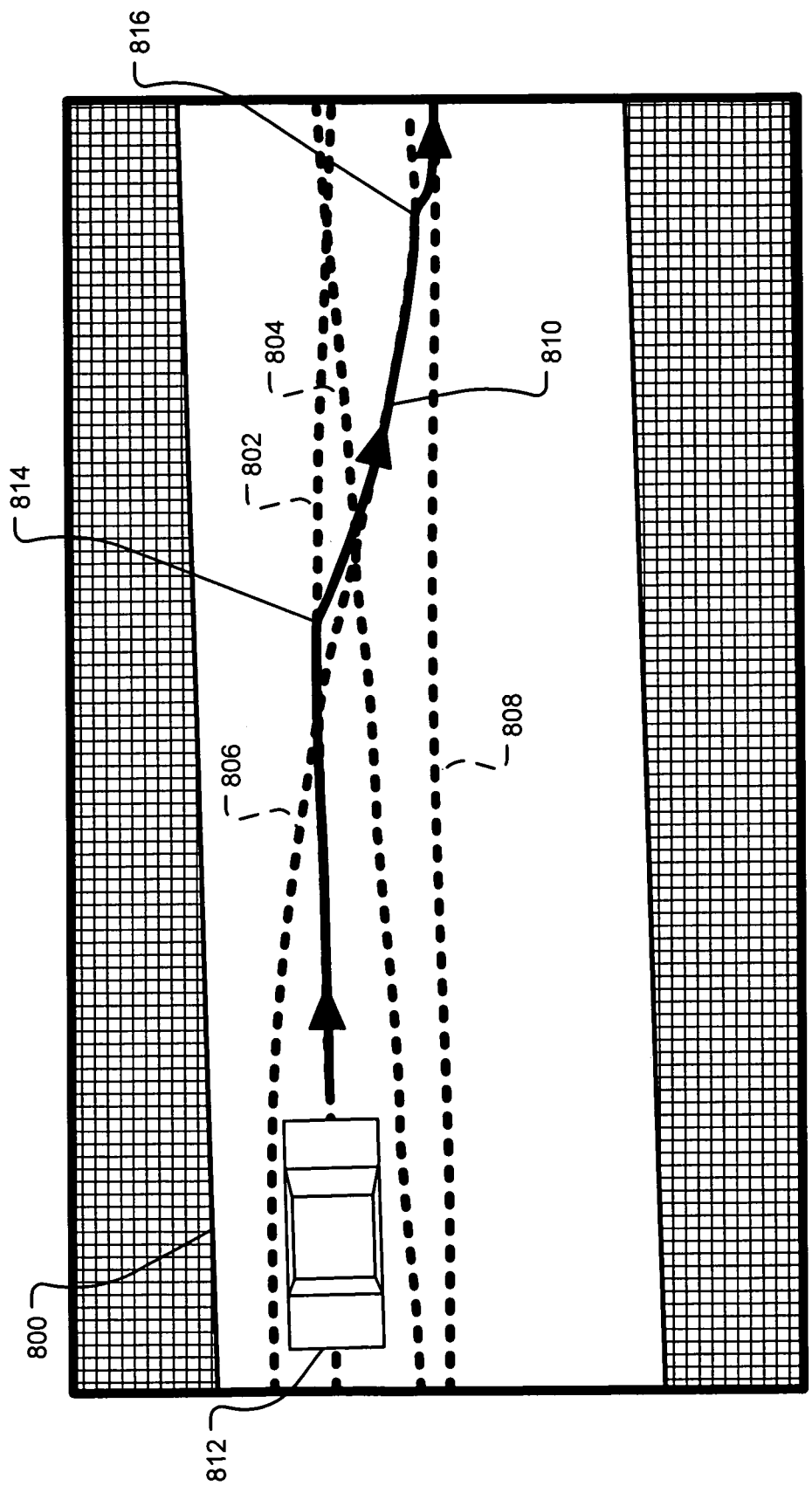
FIG. 8 illustrates a portion of a race course, example prescribed racing lines, and an example simulated path of a virtual race vehicle.

FIG. 8 illustrates a portion 800 of a race course, example prescribed racing lines 802, 804, 806, and 808, and an example simulated path 810 of a virtual racing vehicle 812 or other entity. In some implementations, the prescribed racing lines (representing a type of prescribed motion lines) are defined during game-development time or game- or race-initialization time, although they may also be defined dynamically under some implementations. The vehicle 812 is computer-controlled and travels along one of the prescribed racing lines 802 in the race course. In order to introduce realism into the computer-controlled vehicle's behavior, the vehicle 812 switches from prescribed racing line to prescribed racing line at various times and/or locations along the course. Mixing and/or interpolation may be omitted, although such features may also be used in combination with this switching implementation.

As described above, a course may be divided up into segments delineated by waypoints, and a switching event may be evaluated and/or performed at each waypoint. As shown in FIG. 8, the vehicle 812 switches from prescribed line 802 to prescribed line 806 at point 814. The switching event is probabilistic, and the probability of switching to any line at any point is modulated by the deviation of the current line's position and heading (e.g., gradient) from that of all potential destination lines. At point 814, the simulated path 810 is sampled at random according to probabilities $P_j$ associated with each prescribed line j to determine whether to stay on the current prescribed racing line or to switch to another prescribed racing line. As shown in FIG. 8, the vehicle 812 does not switch from prescribed line 806 until point 816, at which point it switches to prescribed racing line 808.

By probabilistically switching from prescribed racing line to prescribed racing line at probabilistically-determined waypoints, it is unlikely that any two laps driven by a computer-controlled vehicle will be identical. Furthermore, because the simulated path switches at points having a low deviation, the switching appears smooth, even without any blending or interpolation. It should be understood that, in some implementations, the transitions between prescribed racing lines are of such small deviations that no smoothing, blending, or interpolation is required. However, in other implementations, smoothing, blending, and/or interpolation may be employed to transition the simulated path from one prescribed racing line and merge it with another prescribed racing line. Furthermore, although the spacings between the prescribed racing lines appear quite substantial in FIG. 8, a typical implementation may employ much smaller prescribed racing line spacings or separations, which enhances the smoothness of switches.

Figure 9:
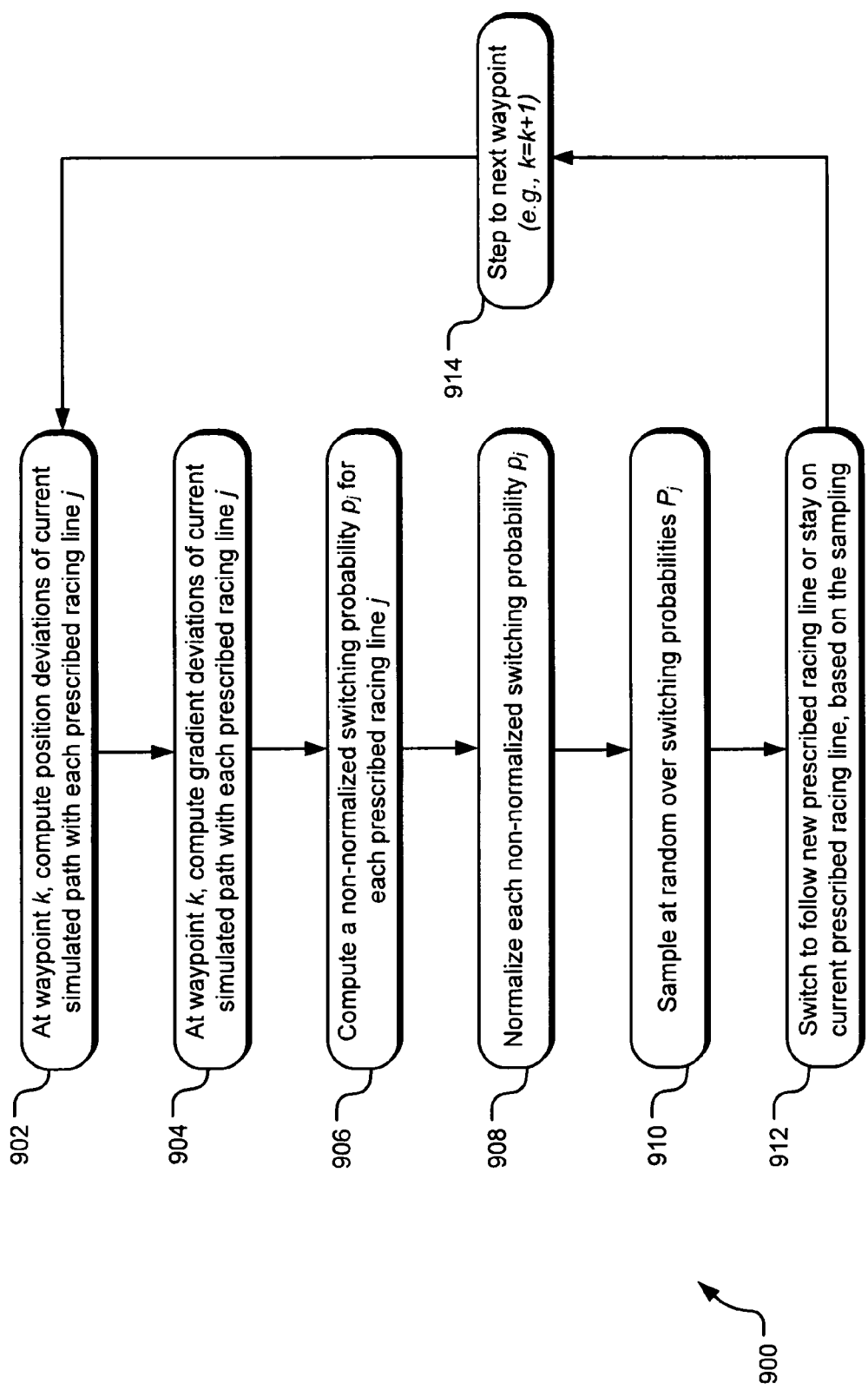
FIG. 9 illustrates operations for modifying motion simulation according to example mixture-based motion lines.

FIG. 9 illustrates operations 900 for modifying motion simulation according to example mixture-based motion lines. In one implementation, the position of a line at any given waypoint around a course may be specified in terms of an orthogonal deviation $\chi$ from the fixed course centerline. A value of $\chi=1$ represents the left-hand edge of the course, and $\chi=-1$ represents the right-hand edge of the course. It should be understood, however, that other methods of parameterization of this problem may be employed.

The description of FIG. 9 assumes a set of N prescribed motion lines $\chi_{jk}$ among which a simulated racer may switch, wherein j indexes the line number from 1 to N and k indexes the waypoint along the racing course. A current prescribed motion line index at k is given as $\lambda$. A computation operation 902 computes position deviations $d_{j,0}$ between the current simulated path and each prescribed motion line j at waypoint k:

$$d_{j,0}=|\chi_{\lambda,k}-\chi_{jk}| \quad (5)$$

Another computation operation 904 computes gradient deviations $d_{j,1}$ between the current simulated path and each prescribed motion line j at waypoint k:

$$d_{j,1}=|\Delta\chi_{\lambda,k}-\Delta\chi_{jk}| \quad (6)$$

where $\Delta\chi_{jk}$ is some measure of the direction of line j at waypoint k, such as a numerical approximation of the derivative of $\chi_{jk}$ with respect to the waypoint k: $\Delta\chi_{jk}=\chi_{j,k+1}-\chi_{j,k}$.

Another computing operation 906 computes a non-normalized switch probability $p_j$ for each prescribed motion line j:

$$p_j=e^{-w_0 d_{j,0}^2 - w_1 d_{j,1}^2} \quad (6)$$

where $w_0$ and $w_1$ are adjustable weighting factors that scale and balance the position and gradient influences as desired. In one implementation, each weight is set to $10^4$, although other weights are contemplated. A larger weight implies that the p values decrease more rapidly when the lines being compared are more disparate for the influence (e.g., spacing or gradient). Note that for the prescribed motion line $\lambda$, which the simulated path currently follows, $p_\lambda=1$, regardless of the weight settings.

A normalizing operation 908 normalizes the non-normalized switching probabilities $p_j$ to yield normalized probabilities $P_j$:

$$P_j = \frac{p_j}{\sum_{j'} p_{j'}} \quad (6)$$

where j' represents the summing index.

In a sampling operation 910, a sampling module samples the simulated path at random according to these probabilities $P_j$ to select a potentially new prescribed motion line to follow. Note that since $p_\lambda=1$ and all $p_j<=1$, the most likely outcome will be that the simulated racer remains on the current prescribed motion line. However, where prescribed motion lines intersect and/or when they intersect or converge at nearly parallel directions, the probability of switching to a new prescribed motion line is significant.

A switching operation 912 alters the racer controls to start following the prescribed motion line selected in the sampling at waypoint k. In one implementation, a motion line generation system is looking a certain number of waypoints m ahead of the racer's current position (e.g., waypoint k−m), examining the oncoming position on the appropriate prescribed line. If the motion line generation system, therefore, has detected an oncoming switch of the simulated path from the currently prescribed motion line to another, data representing points on the new prescribed motion line are written into storage that records the simulated motion line (e.g., the simulated path). The racer control system then accesses this data as it approaches waypoint k and generates control signals to steer the simulated motion of the racer from the first prescribed motion line to the prescribed motion line selected in the sampling at waypoint k. A step operation 914 increases the waypoint index to perform the computations on a subsequent waypoint. In one implementation, the process increments from each waypoint to the next, although other intervals are contemplated. Processing then proceeds to the computation operation 902 to restart the loop.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

What is claimed is:

1. A method comprising:
computing one or more switching probabilities associated with switching of simulated motion of an entity in a virtual reality environment from a first prescribed motion line to one or more second prescribed motion lines, the one or more switching probabilities being computed using a computing unit;
sampling at random over the one or more switching probabilities using the computing unit to select an individual switching probability associated with an individual second prescribed motion line that continues along a course to the left or the right of the first prescribed motion line relative to the simulated motion of the entity, the selected individual switching probability representing a probability of the simulated motion of the entity switching from the first prescribed motion line to the individual second prescribed motion line that continues along the course to the left or to the right of the first prescribed motion line relative to the simulated motion of the entity; and
recording data to a system memory representing a switch of the simulated motion of the entity from the first prescribed motion line to the individual second prescribed motion line that continues along the course to the left or the right of the first prescribed motion line relative to the simulated motion of the entity.

2. The method of claim 1 wherein each of the one or more switching probabilities is associated with a different second prescribed motion line.

3. The method of claim 1 wherein the computing comprises:
computing position deviations of the first prescribed motion line with each of the one or more second prescribed motion lines.

4. The method of claim 1 wherein the computing comprises:
computing gradient deviations of the first prescribed motion line with each of the one or more second prescribed motion lines.

5. The method of claim 1 wherein the computing comprises:
computing the one or more switching probabilities as a function of position deviations.

6. The method of claim 1 wherein the computing comprises:
computing the one or more switching probabilities as a function of gradient deviations.

7. The method of claim 1 wherein the computing comprises:
computing the one or more switching probabilities at waypoints as a function of position deviations and gradient deviations at the waypoints.

8. A computer-readable storage device having computer-executable instructions for performing a computer process, the computer process comprising:
computing one or more switching probabilities associated with switching of simulated motion of an entity in a virtual reality environment from a first prescribed motion line to one or more second prescribed motion lines;
sampling at random over the one or more switching probabilities to select an individual switching probability associated with an individual second prescribed motion line that continues along a course to the left or the right of the first prescribed motion line relative to the simulated motion of the entity, the selected individual switching probability representing a probability of the simulated motion of the entity switching from the first prescribed motion line to the individual second prescribed motion line that continues along the course to the left or to the right of the first prescribed motion line relative to the simulated motion of the entity; and recording data representing a switch of the simulated motion of the entity from the first prescribed motion line to the individual second prescribed motion line that continues along the course to the left or the right of the first prescribed motion line relative to the simulated motion of the entity.

9. The computer-readable storage device of claim 8 wherein each of the one or more switching probabilities is associated with a different second prescribed motion line.

10. The computer-readable storage device of claim 8 wherein the computing comprises:

computing position deviations of the first prescribed motion line with each of the one or more second prescribed motion lines.

11. The computer-readable storage device of claim 8 wherein the computing comprises:

computing gradient deviations of the first prescribed motion line with each of the one or more second prescribed motion lines.

12. The computer-readable storage device of claim 8 wherein the computing comprises:

computing the one or more switching probabilities as a function of position deviations.

13. The computer-readable storage device of claim 8 wherein the computing comprises:

computing the one or more switching probabilities as a function of gradient deviations.

14. The computer-readable storage device of claim 8 wherein the computing comprises:

computing the one or more switching probabilities at waypoints as a function of position deviations and gradient deviations at the waypoints.

15. A computing system comprising:

a probability module configured to compute switching probabilities associated with switching of simulated motion of an entity in a virtual reality environment from a first prescribed motion line to one or more second prescribed motion lines;

a sampling module configured to sample at random over the one or more switching probabilities to select an individual switching probability associated with an individual second prescribed motion line that continues along a course to the left or the right of the first prescribed motion line relative to the simulated motion of the entity, the selected individual switching probability representing a probability of the simulated motion of the entity switching from the first prescribed motion line to the individual second prescribed motion line that continues along the course to the left or to the right of the first prescribed motion line relative to the simulated motion of the entity;

a switching module configured to record data to a system memory representing a switch of the simulated motion of the entity from the first prescribed motion line to the individual second prescribed motion line that continues along the course to the left or the right of the first prescribed motion line relative to the simulated motion of the entity; and one or more processing units configured to execute the probability module, the sampling module, and the switching module.

16. The computing system of claim 15 wherein each of the one or more switching probabilities is associated with a different second prescribed motion line.

17. The computing system of claim 15 wherein the probability module computes position deviations of the first prescribed motion line with each of the one or more second prescribed motion lines.

18. The computing system of claim 15 wherein the probability module computes gradient deviations of the first prescribed motion line with each of the one or more second prescribed motion lines.

19. The computing system of claim 15 wherein the probability module computes the one or more switching probabilities as a function of position deviations.

20. The computing system of claim 15 wherein the probability module computes the one or more switching probabilities as a function of gradient deviations.

21. The computing system of claim 15, wherein the one or more second prescribed motion lines comprise multiple second prescribed motion lines that continue to the left or to the right of the first prescribed motion line relative to the simulated motion of the entity.

22. The method of claim 1, wherein the individual second prescribed motion line intersects the first motion line at one or more points on the course.

23. The method of claim 22, wherein the one or more switching probabilities increase as the entity approaches the one or more points where the individual second prescribed motion line intersects the first motion line.

* * * * *